US009432896B2

(12) United States Patent
Foxworthy et al.

(10) Patent No.: US 9,432,896 B2
(45) Date of Patent: *Aug. 30, 2016

(54) MOBILITY ACROSS SATELLITE BEAMS USING L2 CONNECTIVITY

(71) Applicant: ViaSat, Inc., Carlsbad, CA (US)

(72) Inventors: Michael Foxworthy, Carlsbad, CA (US); Girish Chandran, Carlsbad, CA (US); Jason Lau, Lafayette, LA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,957

(22) Filed: Jan. 13, 2016

(65) Prior Publication Data

US 2016/0183142 A1    Jun. 23, 2016

Related U.S. Application Data

(63) Continuation of application No. 13/889,021, filed on May 7, 2013, now Pat. No. 9,264,127, which is a (Continued)

(51) Int. Cl.
*H04B 1/26* (2006.01)
*H04W 36/14* (2009.01)
(Continued)

(52) U.S. Cl.
CPC ......... *H04W 36/14* (2013.01); *H04W 36/0016* (2013.01); *H04W 84/06* (2013.01)

(58) Field of Classification Search
CPC .......... H04B 7/18582; H04B 7/18584; H04B 7/18508; H04B 7/18515; H04B 7/18576; H04B 7/2606; H04B 7/155; H04W 88/04; H04W 16/26; H04W 84/047; H04W 84/12; H04W 36/0016; H04W 84/06; H04L 2012/5608
USPC ...................... 370/316, 315, 310.2, 328, 338
See application file for complete search history.

(56) References Cited

U.S. PATENT DOCUMENTS 5,717,686 A    2/1998 Schiavoni
5,875,461 A    2/1999 Lindholm
(Continued)

FOREIGN PATENT DOCUMENTS

GB          2374494 A      10/2002
WO    WO-03/021866 A       3/2003
(Continued)

OTHER PUBLICATIONS

Akyildiz et al., "A Survey of Mobility Management in Next-Generation All-IP-Based Wireless Systems," IEEE Wireless Communications, IEEE Service Center, Piscataway, NJ, US vol. 11, No. 4, Aug. 1, 2004, 14 pgs. (Continued)

*Primary Examiner* — Brenda H Pham
(74) *Attorney, Agent, or Firm* — Holland & Hart LLP

(57) ABSTRACT

Systems and methods for providing mobility across satellite beams, are described. The system includes a first core node, a second core node in communication with the first core node at layer-2 of the OSI model (L2), and a first gateway in communication, at L2, with the first core, the first gateway configured to provide access to a first spot beam at a first location. The system further includes a second gateway in communication, at L2, with the second core node, the second gateway configure to provide access to a second spot beam at a second location, and a mobile device, at the first location, in communication with the first gateway via the first spot beam, wherein the mobile device is assigned an IP address by the first core node. The mobile device moves from the first location to the second location. Further, the first gateway, in response to the mobile device moving from the first location to the second location, notifies the second gateway, through the first core node and the second core node, that the mobile device is moving to the second location, and transmit the session information to the second gateway, and the second gateway, in response to the notification, maintains connectivity with the mobile device using the IP address.

20 Claims, 12 Drawing Sheets

Related U.S. Application Data continuation of application No. 12/761,904, filed on Apr. 16, 2010, now Pat. No. 8,457,035.

(60) Provisional application No. 61/170,359, filed on Apr. 17, 2009, provisional application No. 61/316,776, filed on Mar. 23, 2010.

(51) Int. Cl.
*H04W 36/00* (2009.01)
*H04W 84/06* (2009.01)

(56) References Cited

U.S. PATENT DOCUMENTS

| | | | |
|---|---|---|---|
| 5,899,980 A | 5/1999 | Wilf et al. | |
| 5,940,394 A | 8/1999 | Killian | |
| 6,018,659 A * | 1/2000 | Ayyagari | H04B 7/18504 342/450 |
| 6,038,594 A * | 3/2000 | Puente | H04B 7/18582 709/217 |
| 6,052,560 A | 4/2000 | Karabinis | |
| 6,112,083 A | 8/2000 | Sweet et al. | |
| 6,240,072 B1 | 5/2001 | Lo et al. | |
| 6,249,677 B1 | 6/2001 | Noerpel et al. | |
| 6,829,221 B1 * | 12/2004 | Winckles | H04B 7/18584 370/238 |
| 6,934,262 B1 | 8/2005 | Lau et al. | |
| 6,982,966 B2 | 1/2006 | Eidenschink et al. | |
| 7,017,042 B1 | 3/2006 | Ziai et al. | |
| 7,032,242 B1 | 4/2006 | Grabelsky et al. | |
| 7,054,322 B2 | 5/2006 | D-Annunzio et al. | |
| 7,174,373 B1 | 2/2007 | Lausier | |
| 7,237,017 B1 | 6/2007 | Pecus et al. | |
| 7,289,440 B1 | 10/2007 | Beshal et al. | |
| 7,386,723 B2 | 6/2008 | Seada et al. | |
| RE40,476 E * | 9/2008 | Leuca | H04B 7/18508 370/316 |
| 7,477,597 B2 | 1/2009 | Segel | |
| 7,535,863 B2 | 5/2009 | Gin et al. | |
| 7,616,645 B2 | 11/2009 | Ota et al. | |
| 7,636,360 B2 | 12/2009 | Nagai et al. | |
| 7,636,369 B2 | 12/2009 | Wong | |
| 7,643,409 B2 | 1/2010 | Voit et al. | |
| 7,821,981 B2 | 10/2010 | Smith et al. | |
| 7,889,728 B2 | 2/2011 | Arad et al. | |
| 7,924,882 B2 | 4/2011 | Nagai et al. | |
| 7,983,255 B2 | 7/2011 | Kue | |
| 7,992,174 B2 | 8/2011 | Gin et al. | |
| 8,019,841 B2 | 9/2011 | Ellis et al. | |
| 8,068,827 B2 | 11/2011 | Miller et al. | |
| 8,081,633 B2 | 12/2011 | Veits | |
| 8,195,090 B2 | 6/2012 | Treesh et al. | |
| 8,208,421 B2 | 6/2012 | Dankberg et al. | |
| 8,274,981 B2 | 9/2012 | Foxworthy et al. | |
| 8,279,748 B2 | 10/2012 | Foxworthy et al. | |
| 8,345,650 B2 | 1/2013 | Foxworthy et al. | |
| 8,379,613 B2 | 2/2013 | Foxworthy et al. | |
| 8,427,999 B2 | 4/2013 | Foxworthy et al. | |
| 8,456,986 B2 | 6/2013 | Kimmich et al. | |
| 8,457,035 B2 * | 6/2013 | Foxworthy | H04B 7/18541 370/316 |
| 8,675,486 B2 | 3/2014 | Friedman et al. | |
| 8,804,730 B2 | 8/2014 | Foxworthy et al. | |
| 9,264,127 B2 * | 2/2016 | Foxworthy | H04B 7/18541 |
| 2001/0026537 A1 | 10/2001 | Massey | |
| 2001/0033580 A1 | 10/2001 | Dorsey et al. | |
| 2001/0036161 A1 | 11/2001 | Eidenschink et al. | |
| 2003/0048766 A1 | 3/2003 | D-Annunzio et al. | |
| 2003/0069926 A1 | 4/2003 | Weaver et al. | |
| 2004/0208121 A1 | 10/2004 | Gin et al. | |
| 2006/0047851 A1 | 3/2006 | Voit et al. | |
| 2006/0050736 A1 | 3/2006 | Segel | |
| 2006/0171369 A1 | 8/2006 | Ostrup et al. | |
| 2006/0262724 A1 | 11/2006 | Friedman et al. | |
| 2006/0274744 A1 | 12/2006 | Nagai et al. | |
| 2007/0076607 A1 | 4/2007 | Voit et al. | |
| 2007/0096788 A1 | 5/2007 | Thesling | |
| 2007/0104096 A1 | 5/2007 | Ribera | |
| 2007/0110098 A1 | 5/2007 | Hart et al. | |
| 2007/0147279 A1 | 6/2007 | Smith et al. | |
| 2007/0171918 A1 | 7/2007 | Ota et al. | |
| 2007/0213060 A1 | 9/2007 | Shaheen | |
| 2007/0255829 A1 | 11/2007 | Pecus et al. | |
| 2008/0002579 A1 | 1/2008 | Lindholm et al. | |
| 2008/0043663 A1 | 2/2008 | Youssefzadeh et al. | |
| 2008/0212517 A1 | 9/2008 | Thesling | |
| 2009/0067429 A1 | 3/2009 | Nagai et al. | |
| 2009/0092137 A1 | 4/2009 | Haigh et al. | |
| 2009/0093213 A1 | 4/2009 | Miller et al. | |
| 2010/0260043 A1 | 10/2010 | Kimmich et al. | |
| 2010/0265876 A1 | 10/2010 | Foxworthy et al. | |
| 2010/0265877 A1 | 10/2010 | Foxworthy et al. | |
| 2010/0265878 A1 | 10/2010 | Foxworthy et al. | |
| 2010/0265879 A1 | 10/2010 | Foxworthy et al. | |
| 2010/0265941 A1 | 10/2010 | Foxworthy et al. | |
| 2010/0265950 A1 | 10/2010 | Foxworthy et al. | |
| 2010/0265957 A1 | 10/2010 | Foxworthy et al. | |
| 2015/0103736 A1 | 4/2015 | Foxworthy et al. | |
| 2015/0288443 A1 | 10/2015 | Foxworthy et al. | |

FOREIGN PATENT DOCUMENTS

| | | |
|---|---|---|
| WO | WO-2005/082040 A | 9/2005 |
| WO | WO-2007/103369 A | 9/2007 |
| WO | WO-2007/133786 A | 11/2007 |
| WO | WO-2010/121214 A | 10/2010 |
| WO | WO-2010/121215 A | 10/2010 |
| WO | WO-2010/121216 A | 10/2010 |
| WO | WO-2010/121217 A | 10/2010 |
| WO | WO-2010/121219 A | 10/2010 |
| WO | WO-2010/121220 A | 10/2010 |
| WO | WO-2010/121221 A | 10/2010 |

OTHER PUBLICATIONS

Akyildiz et al., "Mobility Management in Current and Future Communications Network," IEEE Network, IEEE Service Center, New York, NY USA, vol. 12, No. 4, Jul. 1, 1998, 12 pgs.

Akyildiz et al., "Mobility Management in Next-Generation Wireless Systems," Proceedings of the IEEE, New York, US, vol. 87, No. 8, Aug. 1, 1999, 38 pgs.

Feltrin et al., "Design, Implementation and Performances of an On-board Processor-based Satellite Network," Communications, 2004 IEEE International Conference on, vol. 6, No., pp. 3321-3325, Jun. 20-24, 2004.

Held, "Virtual Private Networking, Introduction to Virtual Private Networking," Dec. 31, 2004, Virtual private Networking: a Construction Operation and Utilization Guide, Joh Wiley & Sons, GB, 22 pgs.

Industrial Consortium for S-UMTS, "Final Report S-UMTS: Preparation of Next Generation Universal Mobile Satellite Telecommunications Systems," Nov. 29, 2000, 35 pgs.

Kota, et al., "Integrated SATCOM/Terrestrial Networking: Protocols and DISN/Teleport Interface," Proceedings of the Military Communications Conference (MILCOM), San Diego, Nov. 6-8, 1995, New York, IEEE, US, vol. 1, Nov. 6, 1995, pp. 453-459, XP-000580864.

LAN/MAN Standards Committee of the IEEE Computer Society, IEEE Standard for Local and Metropolitan Area Networks—Virtual Bridged Local Area Networks, IEEE Std 802.1QTM-2005, May 19, 2006, The Institute of Electrical and Electronics Engineers, Inc., USA, 303 pgs.

Mancuso et al., "Switched Ethernet networking Over LEO Satellite," Wireless Communication Systems, 2005, 2nd International Symposium on Siena, Italy, Sep. 5-9, 2005, Piscataway, NJ, US, IEEE, pp. 883-886, Sections I.-IV., 5 pgs.

Shen, "Handover in Packet-Domain UMTS," EE Times Design, Aug. 2, 2002, retrieved from the internet on Aug. 2, 2010 at:

(56) References Cited

OTHER PUBLICATIONS http://www.eetimes.com/design/communications-design/4018087/Handover-in-packet-Domain-UMTS, 6 pgs.

Shneyderman, "Mobile VPNs for Next Generation GPRS and UMTS Networks," White Paper Lucent Technologies, Dec. 31, 2000, retrieved online at: www.esoumoy.free.fr/telecom/tutorial/3G-VPN.pdf, 16 pgs.

Senevirathne et al., "Ethernet Over IP—a Layer 2 VPN Solution Using Generic Routing Encapsulation (GRE)," working document of the Internet Engineering Task Force (IETF), http://tools.ietf.org/html/draft-tsenevir-l2vpn-gre-00#section-2, 6 pgs.

\* cited by examiner

MOBILITY ACROSS SATELLITE BEAMS USING L2 CONNECTIVITY

PRIORITY CLAIM

This application is a continuation of U.S. patent application Ser. No. 13/889,021, entitled "Mobility Across Satellite Beams Using L2 Connectivity," filed May 7, 2013, which is a continuation of U.S. patent application Ser. No. 12/761,904, entitled "Mobility Across Satellite Beams Using L2 Connectivity," filed Apr. 16, 2010, which claims the benefit of U.S. Provisional Patent Application Ser. No. 61/170,359, entitled "Mobility Across Satellite Beams Using L2 Connectivity," filed Apr. 17, 2009 and U.S. Provisional Patent Application Ser. No. 61/316,776, entitled "Mobility Across Satellite Beams Using L2 Connectivity," filed Mar. 23, 2010. The entirety of each of the above-identified Applications are expressly incorporated by reference herein for any and all purposes.

RELATED APPLICATIONS

This application is related to: U.S. Provisional Application No. 61/254,551, entitled "Layer-2 Connectivity From Switch to Access Node/Gateway," filed on Oct. 23, 2009; U.S. Provisional Application No. 62/254,553, entitled "Access Node/Gateway to Access Node/Gateway Layer-2 Connectivity (End-to-End)," filed on Oct. 23, 2009; U.S. Provisional Application No. 62/254,554, entitled "Layer-2 Extension Services," filed on Oct. 23, 2009; U.S. Provisional Application No. 61/313,017, entitled "Core-based Satellite Network Architecture," filed on Mar. 11, 2010; U.S. Provisional Application No. 61/316,782, entitled "Multi-Satellite Architecture" filed on Mar. 23, 2010, and U.S. Provisional Application No. 61/316,791, entitled "Acceleration Through a Network Tunnel," filed on Mar. 23, 2010. The entirety of each of the above-identified applications are expressly incorporated by reference herein for any and all purposes.

FIELD OF THE INVENTION

The present invention relates, in general, to mobility in satellite networks, and more particularly, to mobility at layer-2 of the OSI mobile across multiple satellite beams.

BACKGROUND OF THE INVENTION

Presently, for mobile IP implementations each mobile device is identified by its home address (i.e. at the mobile device's home agent) regardless of the mobile's device's current location. While the mobile device is away from its home network, the mobile device is assigned a care-of address. The care-of address identifies the mobile device's current location. The care-of address acts as a local endpoint of a tunnel back to the mobile device's home agent, and the home address. As such, mobile IP specifies how the mobile device registers with its home agent and how the home agent routes data to the mobile device through the tunnel (between the home argent and the care-of address).

Mobile IP has significant drawbacks. One drawback is when the mobile device moves out of its home location, the mobile device's care-of address is a virtual address. Hence, moving out of the home location requires a hand off, which changes the mobile device's IP address by adding a care-of-address. This is particularly problematic in IPv4 networks. Thus, connectivity is temporarily lost, browser session is lost, VPN session is lost, etc. In many applications (e.g., VPN, VoIP), sudden changes in network connectivity and IP address causes significant problems. For example, an SSL tunnel for on-line banking will terminate. Furthermore, the tunnel between the home address and the care-of address is a layer=3 protocol, and as such, the mobile device moves out of its home location the mobile device is no longer connected to the same network (i.e., LAN, subnet, etc.). Additionally, traffic must be routed through the home agent location. For example, if the mobile device and the data the mobile device is accessing are at the same remote location, the data must travel all the way to the home agent location and then circle back to the remote location, thus greatly increasing latency. Accordingly, current mobile IP implementations fail to provide a persistent IP address and persistent connectivity and efficient data transfer over a large geographical area. Hence, for these and other reasons, improvements in the art are needed.

SUMMARY OF THE INVENTION

In one embodiment, a system for providing mobility across satellite beams, is described. The system includes a first core node, a second core node in communication with the first core node at layer-2 of the OSI model (L2), and a first gateway in communication, at L2, with the first core, the first gateway configured to provide access to a first spot beam at a first location. The system further includes a second gateway in communication, a L2, with the second core node, the second gateway configure to provide access to a second spot beam at a second location, and a mobile device, at the first location, in communication with the first gateway via the first spot beam, wherein the mobile device is assigned an IP address by the first core node. The mobile device moves from the first location to the second location. Further, the first gateway, in response to the mobile device moving from the first location to the second location, notifies the second gateway, through the first core node and the second core node, that the mobile device is moving to the second location, and transmits the session information to the second gateway, and the second gateway, in response to the notification, maintains connectivity with the mobile device using the IP address.

In another embodiment, a method of providing mobility across satellite beams, is described. The method includes providing access to a first spot beam at a first location serviced by a first gateway, providing access to a second spot beam at a second location serviced by a second gateway, and assigning a mobile device, at the first location, an IP address by the first gateway. The mobile device moves from the first location to the second location. The method further includes in response to the mobile device moving from the first location to the second location, notifying the second gateway, through a first core node and a second core node, that the mobile device is moving to the second location, transmitting the session information to the second gateway and in response to the notification, maintaining connectivity with the mobile device using the IP address.

In yet another embodiment, a computer-readable medium for providing mobility across satellite beams, is described. The computer-readable medium includes instructions for providing access to a first spot beam at a first location serviced by a first gateway, providing access to a second spot beam at a second location serviced by a second gateway, and assigning a mobile device, at the first location, an IP address by the first gateway. The mobile device moves from the first location to the second location. The computer-readable medium further includes instructions for in response to the mobile device moving from the first location to the second location, notifying the second gateway, through a first core node and a second core node, that the mobile device is moving to the second location, transmitting the session information to the second gateway and in response to the notification, maintaining connectivity with the mobile device using the IP address.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment, it being understood that various changes may be made in the function and arrangement of elements without departing from the spirit and scope as set forth in the appended claims. Some of the various exemplary embodiments may be summarized as follows.

Aspects of the invention include providing mobility among multiple satellite beams. Particularly, a mobile device (or client) is able to move among satellite and maintain the same consistent IP address. Furthermore, the mobile device is able to remain within the same network (i.e., LAN, subnet, etc.) while moving through coverage of multiple satellite beams. Aspects of the invention are realized, in part, due to end-to-end layer-2 connectivity throughout the ground segment network.

Figure 1:
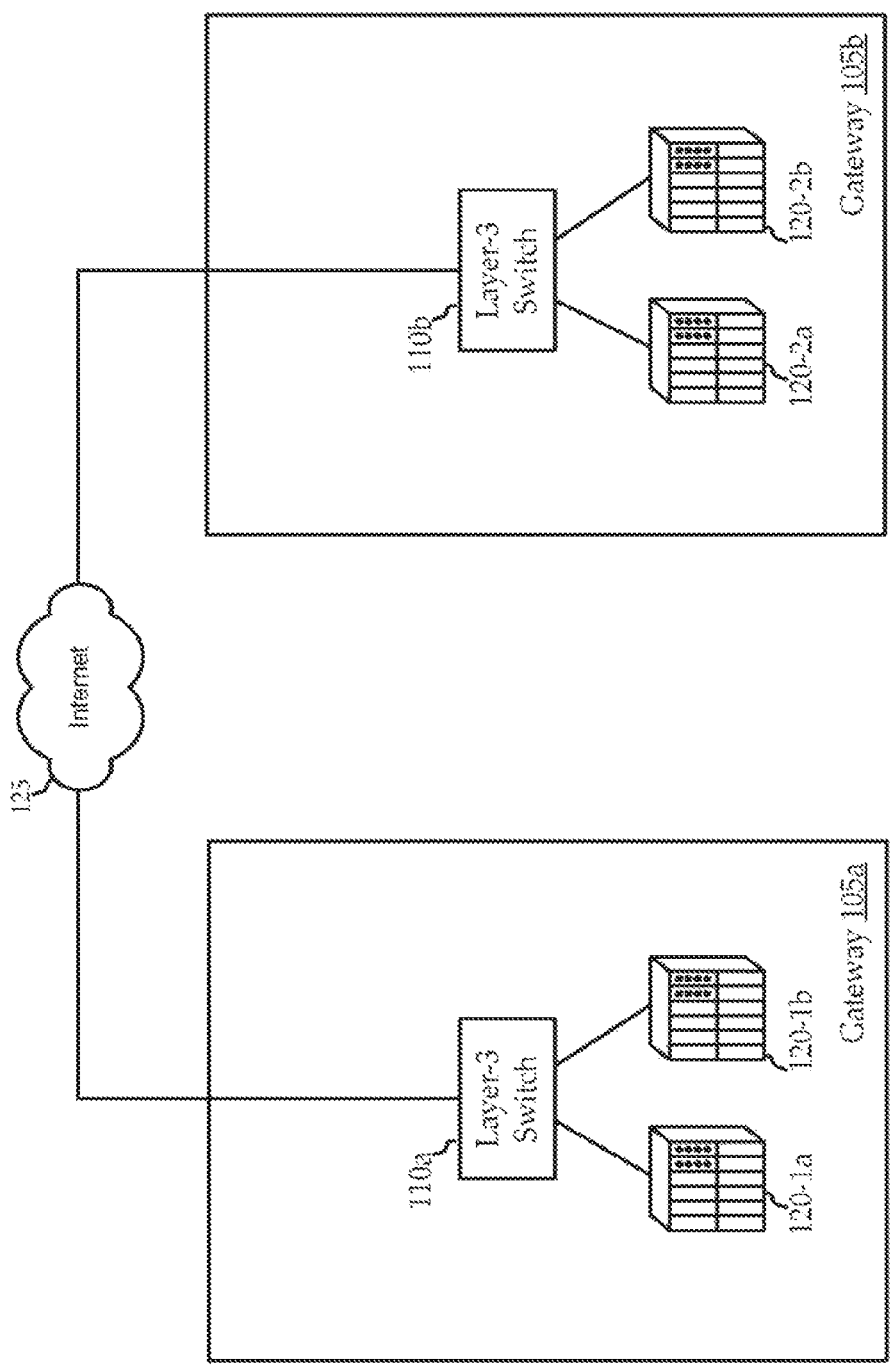
FIG. 1 shows a block diagram of one embodiment of a gateways within a satellite communications networks.

FIG. 1 illustrates a gateway 105a in communication with a gateway 105b. further, gateways 105a and 105b are in communication with the Internet 125. The gateways 105 receive requests at a satellite modem termination system (SMTS) 120. The SMTS 120 sends the request to a layer-3 switches 110 (a and b).

As used herein, a "routed network" refers to a network having a number of routers, configured to use protocols at layer-3 and above of the OSI stack (e.g., or substantially equivalent types of protocols) to route data through the network. The layer-3 switch as used herein, is intended to broadly include any type of network device configured to route at layers 3 and above of the OSI stack (e.g., or provide substantially similar network layer functionality). Particularly, routing is intended to be distinguished from switching (e.g., at layer 2 of the OSI stack (e.g., or substantially similar functionality), as will become more clear from the description below.

While utilizing higher layers to route communications may provide certain features, such as enhanced interoperability, it may also limit certain capabilities of the network. As one exemplary limitation, at each node where a layer-3 routing decision is made, determining the appropriate routing may involve parsing packets headers, evaluating parsed header information against routing tables and port designations, etc. These steps may limit the type of traffic that can be sent over the network, as well as the protocols available for transport on the network.

In another exemplary limitation, at each router, layer-2 headers are typically stripped off and replaced with other tags to identify at least the next routing of the data through the network. As such, it is impossible to maintain a single network between routed terminals. In other words, a packet which is generated at one LAN, passes through one or more routers (i.e. at layer-3 or above) and is received at another LAN, will always be considered to be received from a different network. Accordingly, any benefit of a single network configuration is unattainable in a layer-3 routed network. For example, tags for supporting proprietary service providers networks, Multiprotocol Label Switching (MPLS), and/or other types of networks are impossible to maintain across large geographic regions (e.g., multiple LANs, WANs, subnets, etc.).

For example, CPEs (not shown) and other client devices connected to gateway 105a could not be located on the same network (e.g., same LAN, subnet, etc.) as CPEs connected to gateway 105b. In other words, once a packets from layer-3 switch 110a were sent to layer-3 switch 110b, the packets would no longer be considered to be on the same network (e.g., LAN, subnet, etc.) as gateway 105a's network. Accordingly, virtual networking protocols such as, VPN, MPLS, etc., must be used for sending traffic between gateway 105a and 105b. Furthermore, depending on the type of service if the service or services fail on gateway 105a, then gateway 105b may be unable to provide the failed service or services to CPEs connected to gateway 105a (the two gateways are, from a networking prospective, isolated). However, if the traffic between gateway 105a and 105b was switched at layer-2, then gateway 105b would be able to provide the failed service or services to the CPEs connected to gateway 105a.

Figure 2:
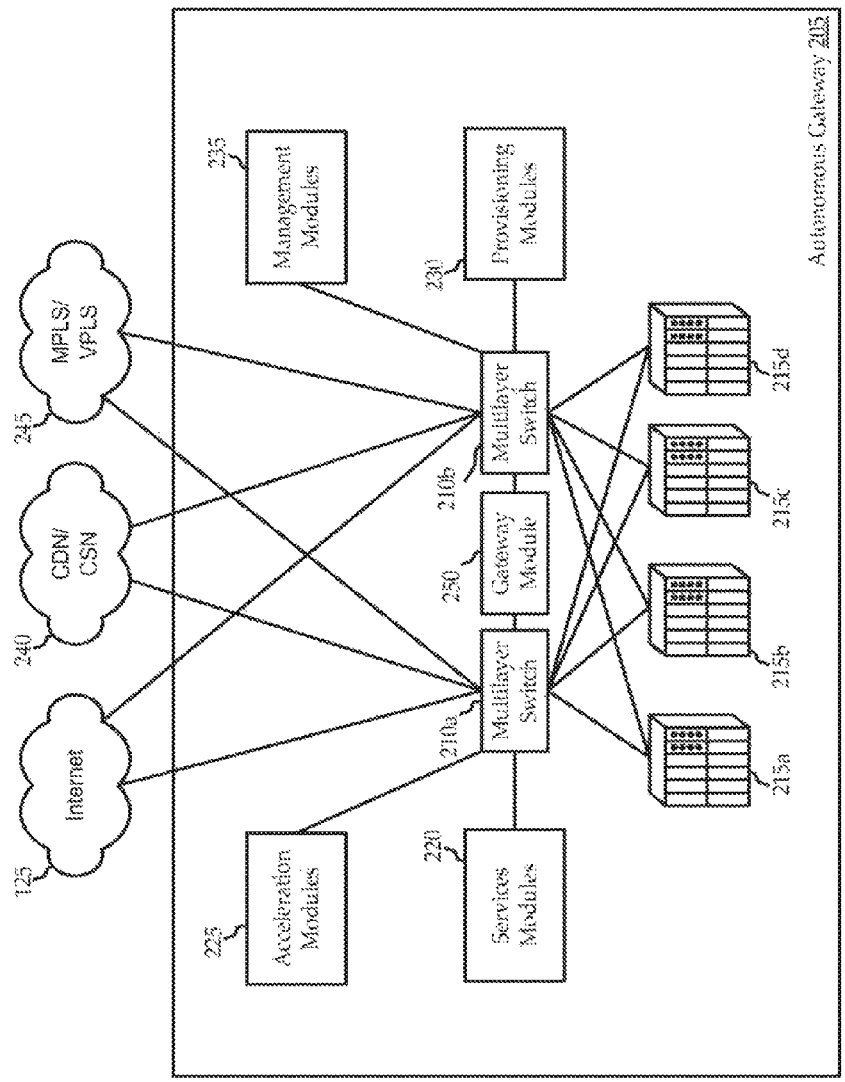
FIG. 2 shows a block diagram of an embodiment of an autonomous gateway, according to various embodiments of the invention.

FIG. 2 show an embodiment of an autonomous gateway 205, according to various embodiments of the present invention. In some embodiments, the autonomous gateway 205 includes one or more SMTSs 215 (a-d), which implements substantially as the SMTSs 215 of the non-autonomous gateway 305 of FIG. 3. The SMTSs 215 may be in communication with one or more multilayer switches 210a and 210b. The multilayer switches 210a and 210b may be in communication with a gateway module 250, and may also be in communication with the Internet 125, CDN/CSN networks 240, or MPLS/VPLS networks 245. The multilayer switches 210a and 210b may be configured to process data to and from one or more modules. For example, the multilayer switches 210a and 210b may be in communication with services module 220, acceleration modules 225, provisioning modules 230, and/or management modules 235. It will be appreciated that, unlike the gateway 105 of FIG. 1, in accordance with aspects of the present invention, embodiments of the autonomous gateway 205 are able to implement some of the enhanced functionality of the non-autonomous gateways 305 and core node 405.

In one embodiment, autonomous gateway 205 is configured to operate autonomously or separately from other gateways and/or core nodes. For example, using services module 220, acceleration modules 225, provisioning modules 230, and management modules 235, autonomous gateway 205 is able to completely manage requests received through SMTSs 215 and multilayer switches 210a and 210b. Furthermore, since multilayer switches 210a and 210b are equipped to handle requests at both layer-2 and layer-3, autonomous gateway 205 is not limited in the same ways as gateway 105.

In one embodiment, services module 220 may include services, such as, AAA, RADIUS, DHCP, DNS, TFTP, NTP, PKE, etc. furthermore, management modules 235 may include billing, terminal, shell, IP flow information export 9IPFIX), traffic and/or flow accounting and analysis, SNMP, syslog, etc. Accordingly, autonomous gateway 205 is equipped to function as a "stand-alone" entity, locally (or pseudo-locally) providing services and management to CPEs.

Figure 3:
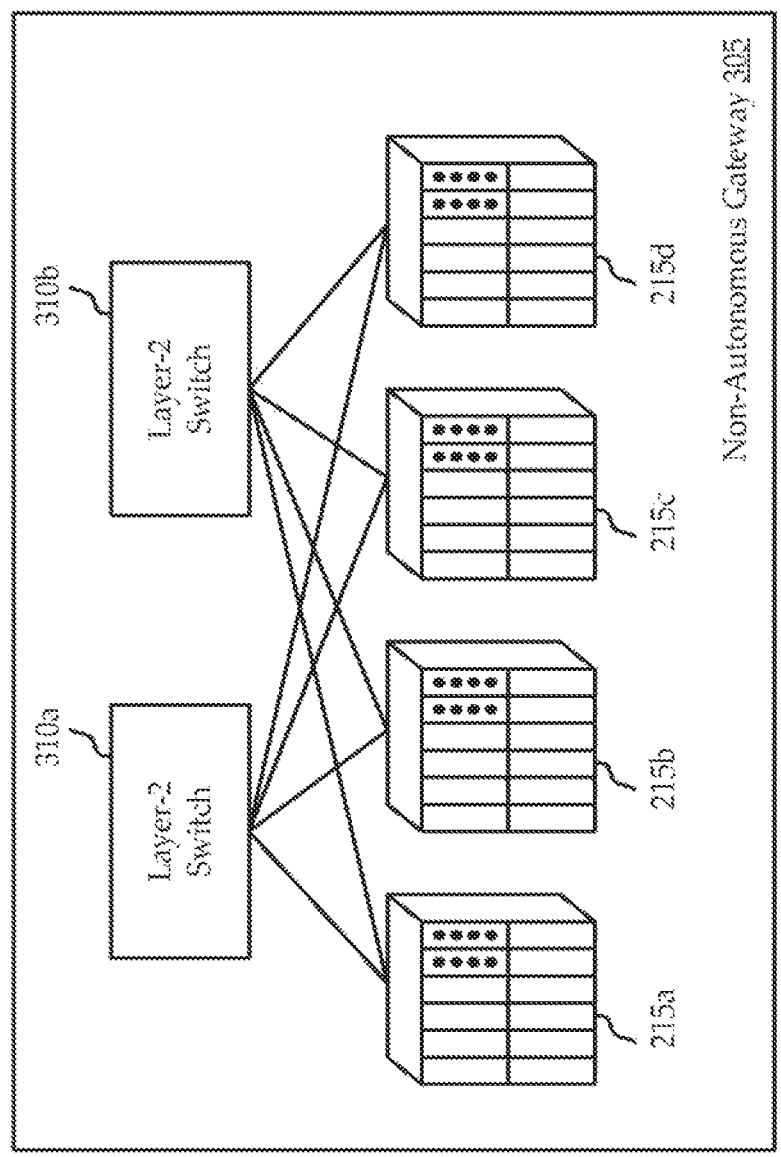
FIG. 3 shows a block diagram of an embodiment of a non-autonomous gateway, according to various embodiments of the invention.

Turning now to FIG. 3, illustrating an embodiment of a non-autonomous gateway 305, in accordance with embodiments of the present invention. The non-autonomous gateway 305 may include a number of SMTSs 215 (a-d). Embodiments of each SMTS 215 include multiple base stations (not shown). For example, each base station may be implemented on a circuit card or other type of component integrates into the SMTS 215. The illustrated non-autonomous gateway 305 includes four SMTSs 215, each in communication with two layer-2 switches 310a and 310b. For example, each SMTS 215 is coupled with both layer-2 switches 310a and 310b to provide redundancy and/or other functionality. Each layer-2 switch 310 may then be in communication with a core node 405.

Embodiments of the non-autonomous gateway 305 are configured to support minimal functionality and provide minimal services. Unlike the autonomous gateway 205, non-autonomous gateway 305 does not include services module 220, acceleration modules 225, provisioning modules 230, and management modules 235. Hence, non-autonomous gateway 305 simple design requires minimal management and maintenance, as well as a significantly lower cost than the autonomous gateway 205. Non-autonomous gateway 305 is configured to send and receive communications through SMTSs 215a-d (e.g., to and from a satellite) and similarly send and receive communications through layer-02 switches 310a and 310b (e.g., to and from core node 405).

Figure 4A:
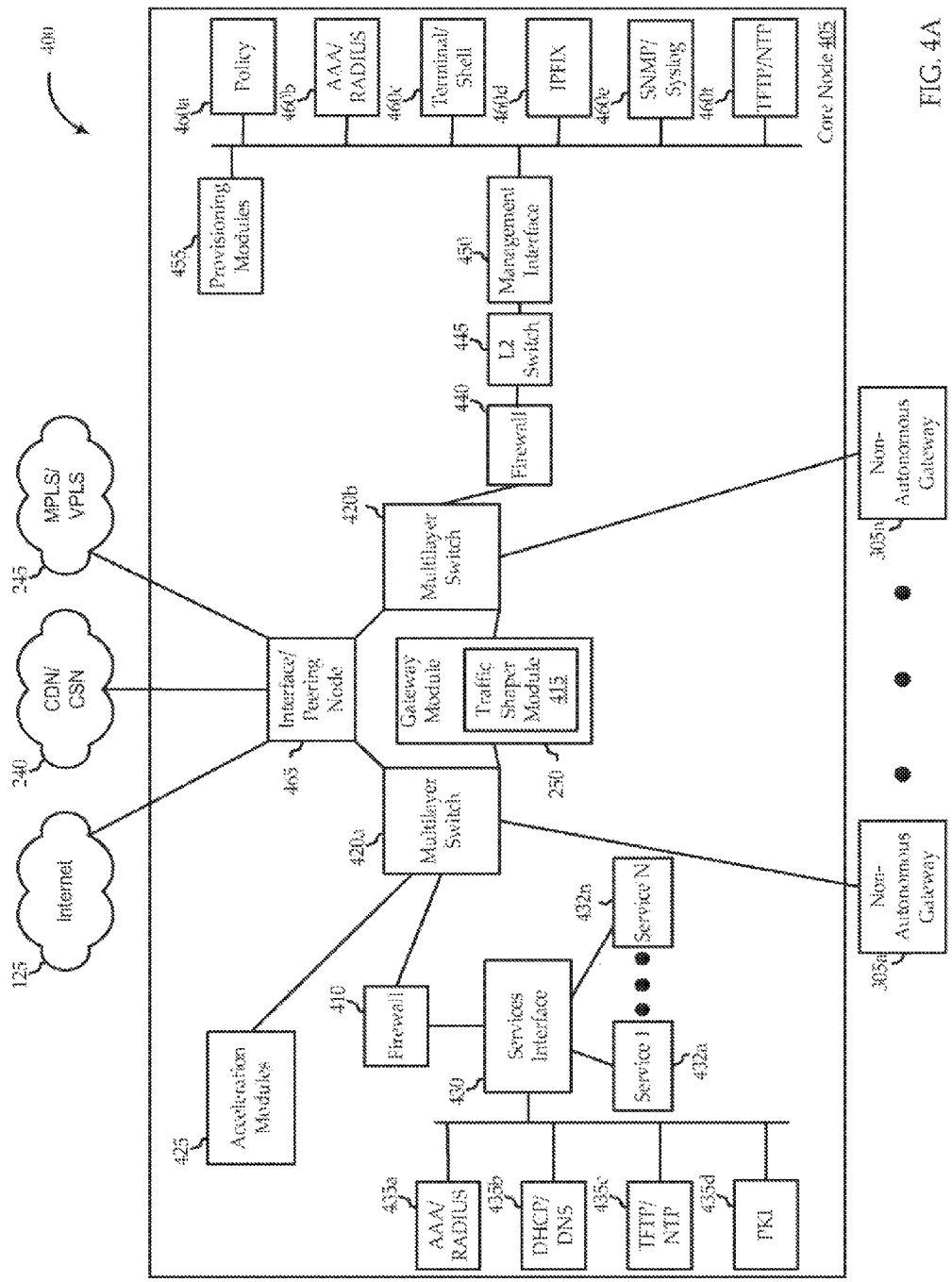
FIG. 4A shows a block diagram of a core node within a satellite communications network, according to various embodiments of the invention.

FIG. 4 illustrates a core node 405, in accordance with one embodiment of the present invention. Core node 405 may be in communication with 1 to N non-autonomous gateways 305. As discussed above, the non-autonomous gateways 305 communicate with the core node 405 using layer-2 connectivity between one or more layer-2 switches 310 in the non-autonomous gateways 305 and one or more multilayer switches 420a and 420b in the core node 405. The illustrative core node 405 is in communication with multiple non-autonomous gateways 305a-305n via multilayer switches 420a and 420b. In various embodiments, the multilayer switches 420a and 420b are in communication with each other either directly or indirectly (e.g., via a gateway module 250).

In some embodiments, the gateway module 250 includes one or more processing components for processing traffic received at the multilayer switches 420a and 420b. In one embodiment, the gateway module 250 includes a traffic shaper module 415. The traffic shaper module 415 is a service which is configured to assist in optimizing performance of network communications (e.g., reduce latency, increase effective bandwidth, etc.), for example, by managing packets in a traffic stream to conform to one or more predetermined traffic profiles.

The multilayer switches 420a and 420b may further be in communication with one or more of the Internet 125, CDN/CSN networks 240, and MPLS/VPLS networks 245. In some embodiments, the core node 405 includes an interface/peering node 465 for interfacing with these networks. For example, an Internet service provider or CDN service provider may interface with the core node 405 via the interface/peering node 465.

Embodiments of the multilayer switches 420a and 420b process data by using one or more processing modules or interfaces in communication with the multilayer switches 420a and 420b. For example, as illustrated, the multilayer switches 420a and 420b may be in communication with AA/RADIUS 435a, DHCP/DNS 435B, TFTP/NTP 435c, or PKI 435d, through a firewall 410 and services interface 430. Furthermore, multilayer switches 420a and 420b may be in communication with a provisioning module 455 through a firewall 440, a layer-2 switch 445, and a management interface 450. In addition to being in communication with provisioning module 455, multilayer switches 420a and 420b may also be in communication with policy module 460a, AAA/RADIUS 460b, terminal/shell 460c, IP flow information export (IPFIX), traffic and/or flow accounting and analysis 460d, SNMP/syslog 460e, and TFTP/NTP 460f. Communication with these modules may be restricted, for example, certain modules may have access to (and may use) private customer data proprietary algorithms, etc., and it may be desirable to insulate the data from authorized external access. In fact, it will be appreciated that many types of physical and/or logical security may be used to protect operations and data of the core node 405. For example, each core node 405 may be located within a physically secured facility, like a guarded military-style installation.

In a further embodiment, services interface may be communication with service 1 432a to service N 432N. Service 1 to service N may be any one of the services described above (i.e., AAA/RADIUS 345a, DHCP/DNS 435b, TFTP/NTP 460f, etc.), as well as other services provided in satellite networking environment. Furthermore, any number of services may be provided (i.e., 1-N number of services).

In one embodiment, the acceleration modules 225 include beam-specific acceleration modules and a failover module which detects a connection failure and redirects network traffic to a backup or secondary connection. Embodiments of the acceleration modules 425 provide various types of application, WAN/LAN, and/or other acceleration functionality. In one embodiment, the acceleration modules 425 implement functionality of AcceleNet applications from Intelligent Compression Technologies, Inc. (:"ICT"), a division of ViaSat, Inc. This functionality may be used to exploit information from higher layers of the protocol stack (e.g., layers 4-7 of the OSI stack) through use of software of firmware operating in each beam-specific acceleration module. The acceleration modules 425 may provide high payload compression, which may allow faster transfer of the data and enhances the effective capacity of the network. In some embodiments, certain types of data (e.g., User Datagram Protocol (UDP) data traffic) bypass the acceleration modules 425, while other types of data (e.g., Transmission Control Protocol (TCP) data traffic) are routed through the accelerator module 350 for processing. For example, IP television programming may bypass the acceleration modules 425, while web video may be sent to the acceleration modules 425 from the multilayer switches 420a and 420b.

In one embodiment, the AAA/Radius module 460b may implement functionality of an Authentication Authorization Accounting (AAA) server, a Remote Authentication Dial-In User Service (RADIUS) protocol, an Extensible Authentication Protocol (EAP), a network access server (NAS), etc. Embodiments of the DHCP/DNS module 435b may implement various IP management functions, including Dynamic Host Configuration Protocol (DHCP) interpretation, Domain name System (DNS) look-ups and translations, etc. Embodiments of the TFTP/NTP module 435c may implement various types of protocol-based functions, including file transfer protocols (e.g., File Transfer Protocol (FTP), trivial file transfer protocol (TFTP), etc.), synchronization protocols (e.g., Network Time Protocol (NTP)), etc. Embodiments of the PKI module 435d implement various types of encryption functionality, including management of Public Key Infrastructures (PKI), etc.

In a further embodiment, policy module 460a may control certain billing functions, handle fair access policies (FAPs), etc. Embodiments of the terminal/shell module 640c may implements various types of connectivity with individual devices. Embodiments of the SNMP/Syslog module 460e may implement various network protocol management and logging functions. For example, the SNMP/Syslog module 460e may use the Simple Network Management Protocol (SNMP) to expose network management information and the Syslog standard to log network messages.

Figure 4B:
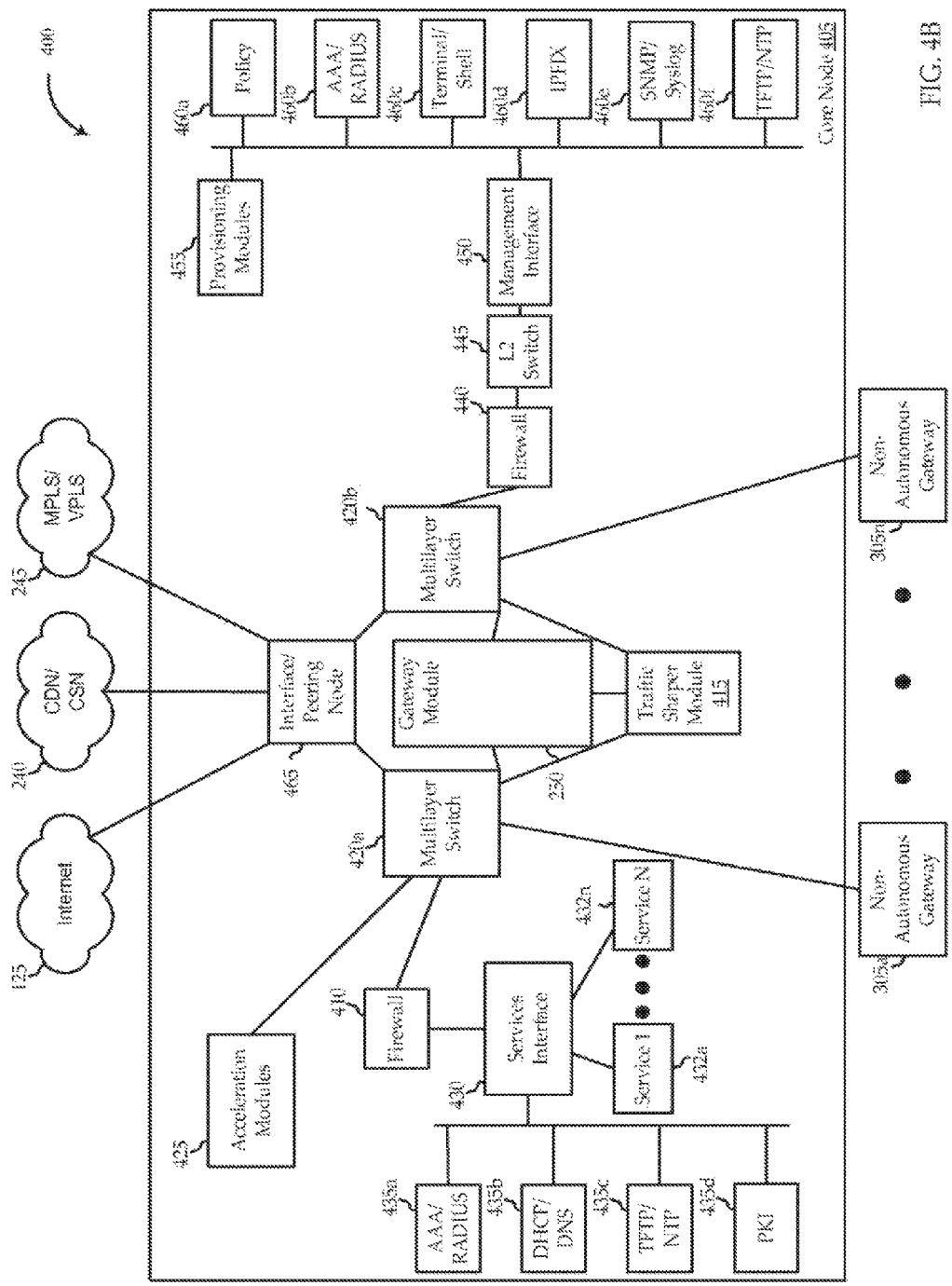
FIG. 4B shows a block diagram of an alternative embodiment of a core node within a satellite communications network, according to various embodiments of the invention.

In an alternative embodiment, FIG. 4B illustrates traffic shaper module 415 operating separately from gateway module 250. In this configuration traffic shaper module 415 may be locally or remotely located from gateway module 250, and may communicate directly with multilayer switches 420a and 420b, or with gateway module 250.

Figure 5A:
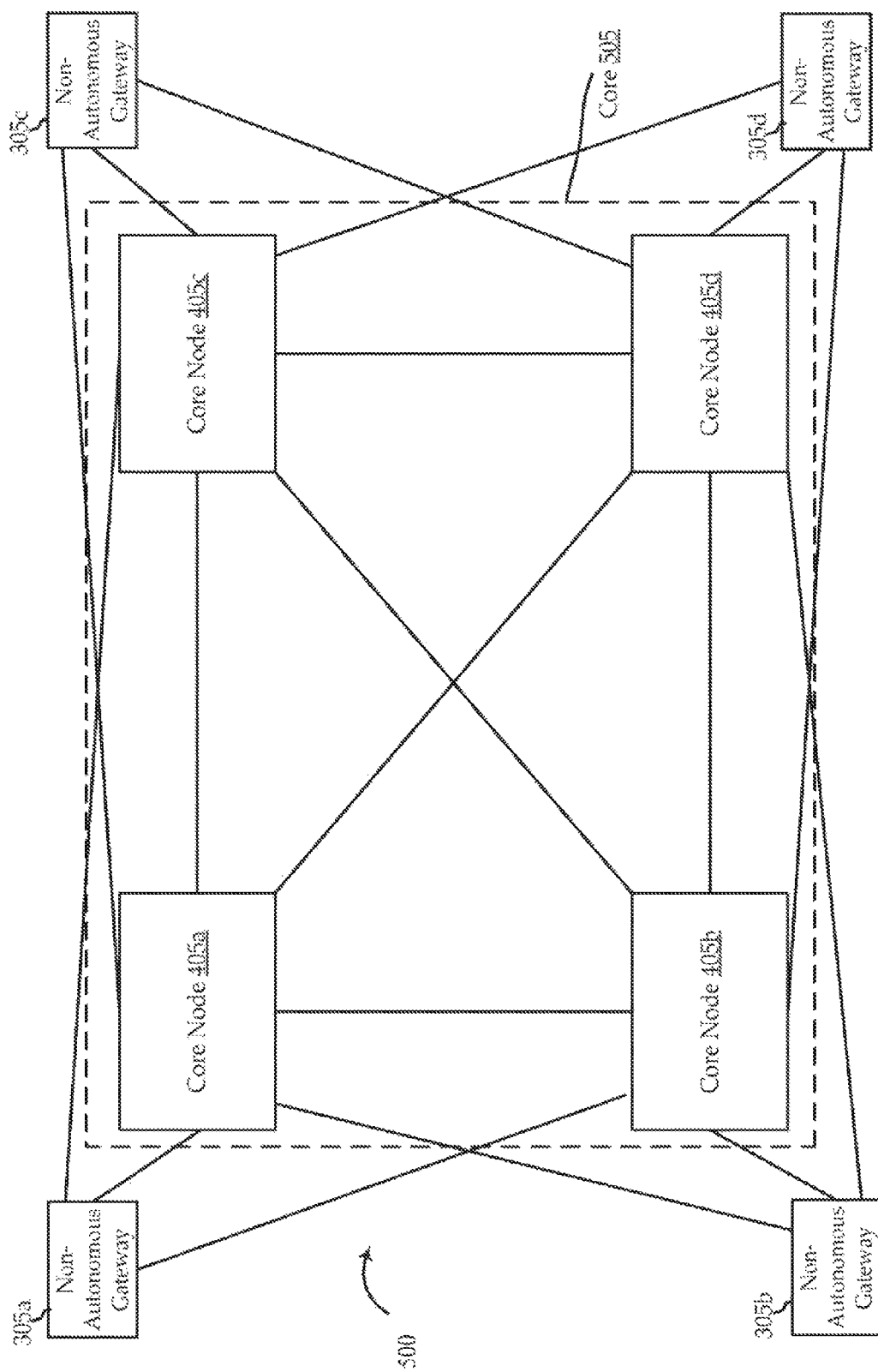
FIG. 5A shows a block diagram of one embodiment of a core node architecture for a satellite communications network, according to various embodiments of the invention.

Accordingly, core node 405 is configured to internally handle various services and functionality. Turning now to FIG. 5A, which illustrates one embodiment of a core-based network architecture 500, implementing a core 505 which includes core nodes 405. In one embodiment, each core node 405a-d is connected to every other core node, and each core node 405a-d is connected to a non-autonomous gateway 305a-d, respectively. The configuration is merely for the purposes of explanation, and it should be noted that any number of core nodes or non-autonomous gateways may be used. Also, core nodes may be indirectly connected to other core nodes, core nodes may be connected to other core nodes through one or more non-autonomous gateway, etc.

Such a network configuration provides significant benefits. For example, service and/or resource specific failure at a core node, or complete failure of a core node is able to be redundantly managed by one or more of the other core nodes. Assuming, for the purpose of explanation, that core node 405a services non-autonomous gateway 305a, core node 405b services non-autonomous gateway 305b, and so forth. If, for example, DHCP service at core node 405b fails, then DHCP service requests from the customers connected with non-autonomous gateway 305b would be serviced through core node 405d, without the customers noticing any change. For example, their IP address, their session, etc., would remain the same. Furthermore, the other services provided by core node 405b (e.g., DNS, acceleration, PKI, etc.) would still be handled by core node 405b, and only the failed service would be diverted to core node 405d.

Such a service specific redundancy scheme is possible by this network configuration, in part, because of the end-to-end layer-2 connectivity, the placement of the core nodes, and structure and configuration of the core nodes 405. For example, if the network did not have end-to-end layer-2 connectivity, then such redundancy would not be possible. If the packets were routed (i.e., layer-3 or above), or virtually switched (i.e., MPLS), then once a packet went from core node 405b to core node 405d, the MAC header of the packet would be altered, and as such the network (i.e., the LAN, subnet, etc.) of the packet would change. Accordingly, the ability to provide service through the new core node (e.g., core node 405d) would be lost.

Similarly, if a core node completely fails or the connection (e.g., fiber cable) between a core node and a non-autonomous gateway fails, then all of the operations of the failed core node are able to be assumed by (or diverted to) one or more other core nodes. For example, if the connection between non-autonomous gateway 305a and core node 405a is cut or damaged, then core node 405c may provide the services previously provided by core node 405a to non-autonomous gateway 405a. In one embodiment, in both examples the core node assuming the failed service in response to a complete failure may be notified of the failure by, for example, time-to-live (TTL) packets, acknowledgment packets, etc. If the core node's functions fall below a threshold, another core node may be triggered to assume servicing of the failed service (or services).

Furthermore, such a network configuration is configured to allow sharing of resources among the core nodes. For example, one or more resources at one code node may be over-burdened, while other core nodes may be running under capacity. In such a situation, some or all of the services from the over-burdened core node may be diverted to one or more other core nodes. As such, the usage of all cores may be distributed in order to maximize core node resource use and avoid a core node from being over committed.

It should be noted that any available path within network 500 may be used. For example, it may be more efficient or necessary for a failed service at core node 405*c* to be handled by core node 405*b*, by passing through non-autonomous gateway 305*d*. As such, network 500 provides completely dynamic paths among the core nodes 405 and non-autonomous gateways 305. Furthermore, within network 500, any service can be provided to any customer by any core at any time. In one embodiment, core node connectivity may be fully meshed at layer-2 using VPLS.

In one embodiment, because core node 405 is configured to provide end-to-end layer-2 connectivity across a network, core node 405 is able to more easily peer with one or more public or private networks. For example, a public or private networks connect with non-autonomous gateway 305*d*. The customers connected to non-autonomous gateways 305*a-c* can receive the content from the peering node connected to non-autonomous gateway 305*d*, as though the peering node was connected directly to their respective non-autonomous gateways 305*a-c*. This is due, in part, to the end-to-end layer-2 connectivity and inter-code connectivity. As suck, the content provided by the peering node to customers connected with non-autonomous gateway 305*d* is also provided to each of the other customers connected with non-autonomous gateways 305*a-c*. As such, peering at one node that is geographically dispersed from another nodes (or gateways) are able to provide access to the network for which the first node is peered with. For example, by peering with a network in Dallas, network 400 has access to the network from Denver (or anywhere else with network 40).

For example, a peering node in Dallas connected to a non-autonomous gateway 305 in Dallas can provide their content to customers in San Francisco (e.g., non-autonomous gateway 305*a*), Denver (e.g., non-autonomous gateway 305*b*), Salt Lake (e.g., non-autonomous gateway 305*c*), by only connecting through a single drop point (i.e., Dallas). As such, a peering node providing content significantly increases the number of customers, without adding additional drop points. This is particularly useful in a peering context because in order for a peering relationship to exist, the two networks need to be "peers" (i.e., be relatively equal in content and customer base). Network 500 significantly increases the number of customers that the entity implementing network 500 can represent to the potential peer, thus increasing the likelihood of developing a peering (or equal) relationship.

Similar to a peering node, network 500 may connect with content service network (CSN) 240 and/or content delivery network (CDN) 240 through one or more gateways 305. Like a peering relationship, CSN/CDN 240 provides content and services to a network provider, and typically such CSN/CDNs 240 are located at high traffic areas (e.g., New York, San Francisco, Dallas, etc.). Moving these CSN/CDNs 240 to more remote of more locations is often not economical. Accordingly, network 500 allows CSN/CDN 240 to connect at any gateway 305 or core node 405, and not only provide the content and/or services to the customers at the connected core node 405 or non-autonomous gateway 305, but to customers within the entire network 500 connected to all non-autonomous gateways 305 and core nodes 405. Thus, the CSN/CDN 240 can connect at one drop point, and provide content to all customers within network 500.

This, in part, is made possible by the end-to-end layer-2 connectivity of network 500. If the network was routed, then the customers not directly connected to the gateway or core node at the drop point for the CSN/CDN 240, are difficult to be on the same network and would not be able to receive the content and services. Furthermore, the redundancy scheme of network 500 provides a sufficient amount redundancy to accommodate for such a large number of customers. Without the redundancy scheme of network 500, CSN/CDN 240 would not be able to be sufficiently supported.

Additionally, network 500 is capable of utilizing out-of-band fail over networks for additional redundancy (e.g., out of band (00B) network). Again, the out-of-band network can only be connected to one non-autonomous gateway 305 or core node 405, but still provide the redundancy to any part of network 500. As such, network 500 need only connect to the out-of-band network at one location in order to gain the benefit of the out-of-band network throughout the entire network 500.

Furthermore, it should be noted that the configuration illustrated in FIG. 5A should not be construed as limiting, and any number of variations to the network architecture may be used. For example, a non-autonomous gateway may be connected to two core nodes and no other non-autonomous gateways. Alternatively, the core nodes may not be interconnected and/or a non-autonomous gateway may be placed between two core nodes. As such any number of variations may be implemented.

Figure 5B:
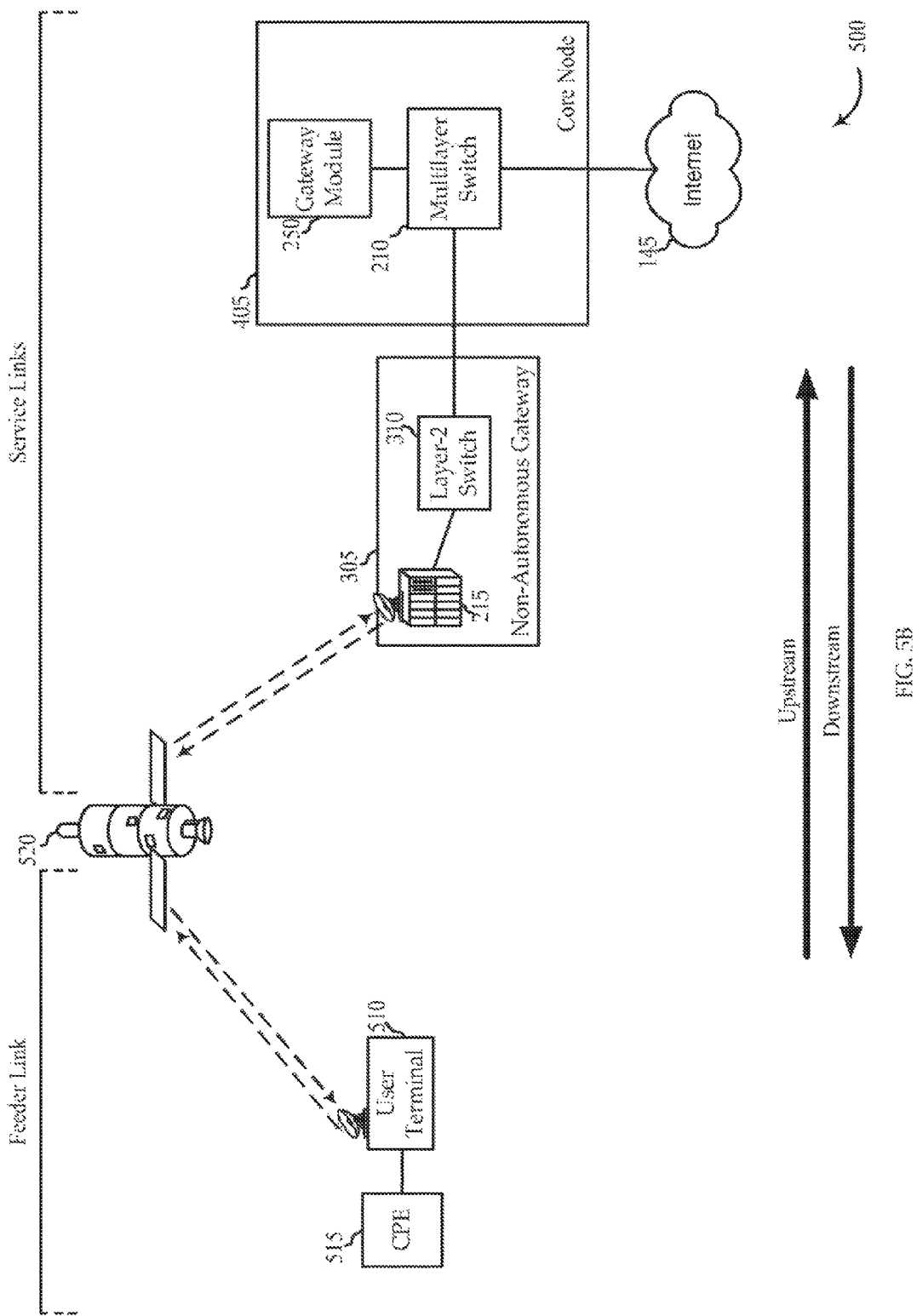
FIG. 5B shows a block diagram of one embodiment of flow of a core node architecture for a satellite communications network, according to various embodiments of the invention

FIG. 5B shows an illustrative communication link between a customer premises equipment (CPE) 515 (i.e., customer, client, etc.) and Internet 145, through a core node 405. In one embodiment, a request is generated at CPE 515, which is sent to UT 510 and then transmitted over satellite 520 to a base station (not shown) in an SMTS 215 at non-autonomous gateway 405. The request is switched at layer-2 though layer-2 switch 310 and sent to a multilayer switch 210 at core node 405. Core node 405 then sends the request to Internet 145 (or any other network destination). A response back to CPE 515 then would flow back through the network, in the same or similar manner.

Figure 6:
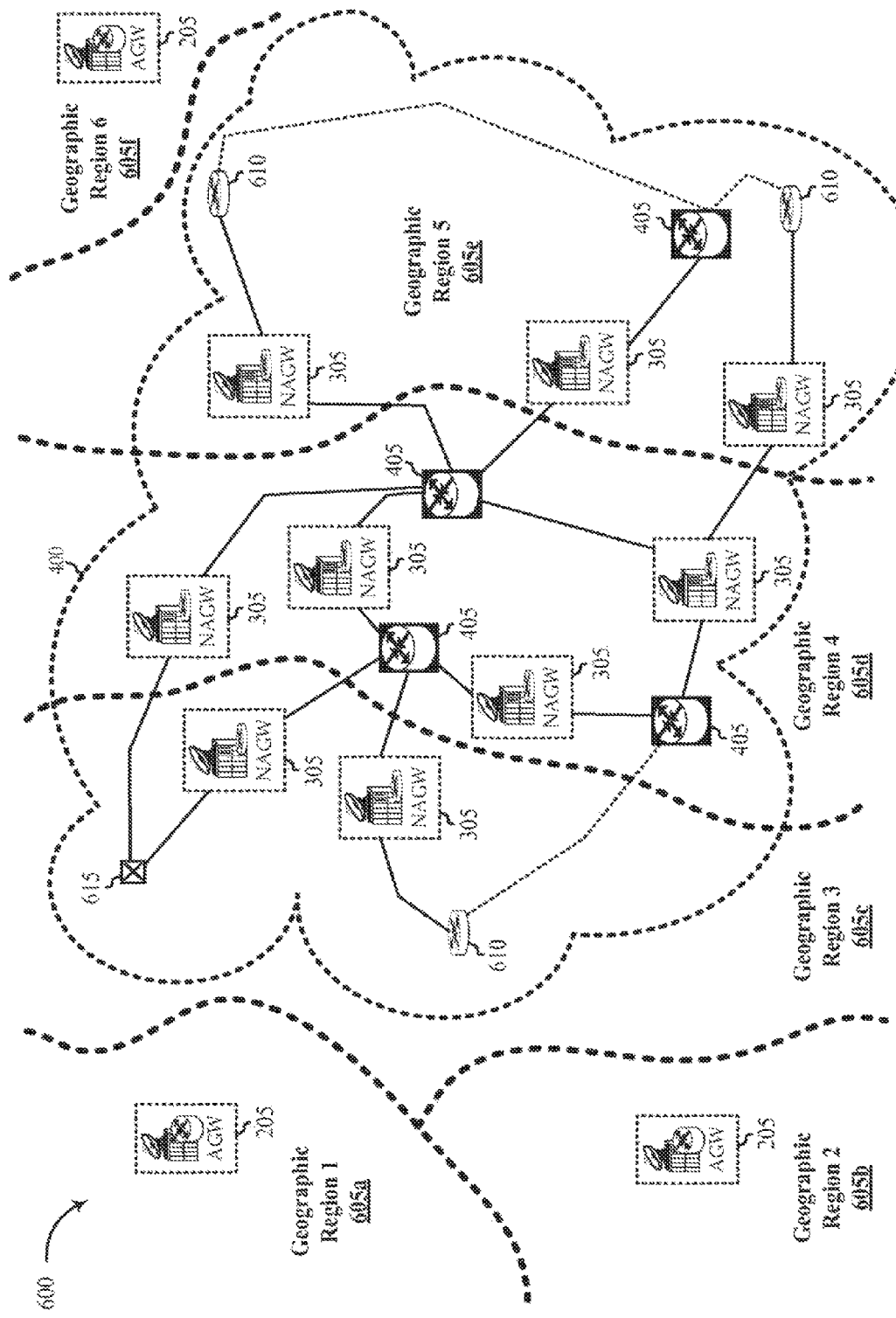
FIG. 6 shows a block diagram of one embodiment of a geographic topology for a core node architecture within a satellite communications network, according to various embodiments of the invention.

FIG. 6 shows an embodiment of a satellite communications network 600 that distributes autonomous gateways 205 and non-autonomous gateways 305 across a number of geographically dispersed regions 605, according to various embodiments. In one embodiment, a first geographic region 605*a*, a second geographic region 605*b* and a sixth geographic region 605*f* represent environments where it is not cost-effective to provide communications with core nodes 265. As such, these geographic regions 605 are illustrated as having autonomous gateways 205. For example, autonomous gateways 205 may be used in island regions, geographically remote regions, regions with particular types of topologies (e.g., large mountain ranges), etc.

In contrast to the above-mentioned regions (geographic regions 605*a*, 605*b*, and 605*f*), a third geographic region 605*c*, a fourth geographic region 605*d*, and a fifth geographic region 605*e* indicate regions where it is cost-effective to implement a core-based non-routed ground segment network 600. As illustrated, each non-autonomous gateway 305 is either directly or indirectly in communication with at least one core node 305 (e.g., typically two core nodes). Other components may also be included in the non-routed ground segment network 600. For example, additional switches 610, optical cross-connects 615, etc., may be used. Further, while the non-routed ground segment network 600 is configured to provide point-to-point layer2 connectivity, other types of connectivity may also be implemented between certain nodes. For example, one or more VPLS networks may be implemented to connect certain nodes of the non-routed ground segment network 600.

In various embodiments, core nodes 405 may be located on a new or existing fiber run, for example, between metropolitan areas. In some configurations, the core nodes 405 may be located away from the majority of spot beams (e.g., in the middle of the country, where much of the subscriber population lives closer to the outsides of the country). In alternative embodiments, core nodes 405 may be located near the majority of spot means. Such spatial diversity between code nodes and subscriber terminals may, for example, facilitate frequency re-use of between service beams and feeder beams. Similarly, non-alternative embodiments, core nodes 405 may be located near the majority of spot means. Such spatial diversity between code nodes and subscriber terminals may, for example, facilitate frequency re-use of between service beams and feeder beams. Similarly, non-autonomous gateways 305 may be located to account for these and/or other considerations.

It is worth noting that, twelve gateways (e.g., including both non-autonomous gateways 305 and autonomous gateways 205) are illustrated. If all were implemented as autonomous gateways 205, the topology may require at least twelve gateway modules, routers, switches, and other hardware components. Further, various licensing and/or support services may have to be purchased for each of the autonomous gateways 205. In some cases, licensing requirements may dictate a minimum purchase of ten thousand licenses for each gateway module, which may require an initial investment into 120-thousand licenses from the first day of operation.

Using aggregated functionality in one or more core nodes 405, however, minimizes some of these issues. For example, by including four core nodes 405, each having a gateway module, and only three of the twelve gateways are autonomous gateways 205. As such, only seven gateway modules may be operating on the non-routed ground segment network 220. As such, only seven instances of each core networking component may be needed, only seven licenses may be needed, etc. This may allow for a softer ramp-up and other features. As can be readily seen, such a consolidation of the autonomous gateway functionality into fewer more robust core nodes 405, is a significant cost savings.

Such a network as network 600 (also network 500) provides geographically expansive network capabilities. Where other nationwide or worldwide network are routed or connected at layer-2.5, layer-3, or higher (e.g., MPLS, etc.), networks 500 and 600 are end-to-end layer-2 switched networks. Such a network, in essence, removes the geographic constraints. Since, for example, if a customer was connected with one of the non-autonomous gateways 305 in geographic region 3 605*c*, and another customer was connected with one of the non-autonomous gateways 305 in geographic region 5 605*e*, the two customers would be configured as though they were connected to the same switch in the same room.

Figure 7:
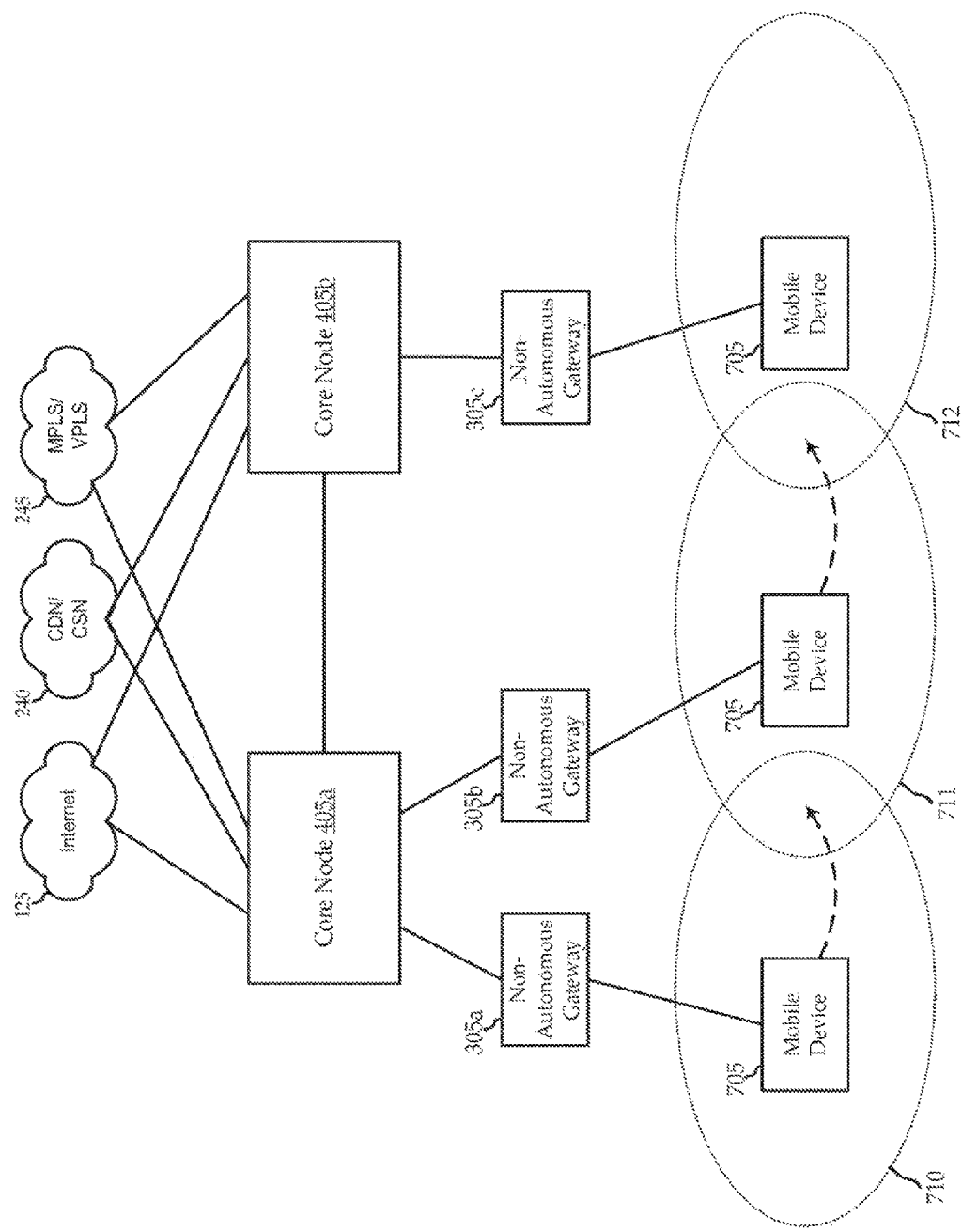
FIG. 7 shows a block diagram of one embodiment of a network for implementing mobility across spot beams, according to various embodiments of the invention.

FIG. 7 shows a block diagram of a system 700 for implementing mobility across satellite spot beams, according to various embodiments of the invention. In one embodiment, system 700 may include core nodes 405*a* and 405*b* in communication with the Internet 125, CND/CSN 240 and MPLS/VPLS networks 245. Core nodes 405*a* and 405*b* are in communication together at layer-2 of the OSI model. Furthermore, core node 405*a* is in communication, at layer-2, with non-autonomous gateway 305*a* and non-autonomous gateway 305*b*, and core node 405*b* is in communication, at layer-2, with non-autonomous gateway 305*c*.

In a further embodiment, each of non-autonomous gateways 305*a-c* service spot beams at locations 710, 711, and 712, respectively. Mobile device 705 is in communication with non-autonomous gateway 305*a* at location 710. in one embodiment, mobile device 705, upon connecting through a spot beam to non-autonomous gateway 305*a* is assigned an IP address, and the IP address is associated with a local area network (LAN). Mobile device 705 executes a number of applications (e.g., an internet browser, and email client, etc.), enterprise applications (VPN, exchange, etc.), etc. While the applications are being executed on mobile device 705, application sessions are established, and reliance on the assigned IP address is necessary by these applications. Further, in the vent that connectivity is lost by the mobile device 705, or mobile device 705's IP address is changed, then application connectivity and the session would be lost.

Assuming now that mobile device 705 is travelling in an airplane (in an automobile on a train, on a ship, etc.), and mobile device 705 has established a VPN session (or other application). As the airplane travels from location 710 to location 711, the spot beam servicing mobile device 705 changes, and accordingly the non-autonomous gateway servicing the spot beam changes from non-autonomous gateway 305*a* to non-autonomous gateway 305*b*. As such, in order to maintain the same IP address, connectivity, the VPN session (in this example), etc., then a handoff of the IP address for mobile device 705 occurs.

In one embodiment, the overlap of spot beam coverage at location 710 and 711 is detected and the eminent transition of mobile device 705, and as such from coverage under the first spot beam and the second spot beam is detected. Once the eminent transition is detected and identified, non-autonomous gateway 305*a* sends "handoff" message to core node 405*a*, and then from core node 405*a* to non-autonomous gateway 305*b*. Each hop is at layer-2 of the OSI model and the messages are at layer-3 and above, which allows the layer-3 protocol to be IP, DECNet, AppleTalk, or the like. As such, each of non-autonomous gateway 305*a*, core node 405*a*, and non-autonomous gateway 305*b* are able to be on the same network (i.e., same subnet, same LAN, etc.).

Accordingly, as mobile device 705 move to location 711, non-autonomous gateway 305*b* is transitioned to maintaining connectivity for mobile device 705. Thus, connectivity is maintained, the same IP address is maintained, and so forth. In a further embodiment, even if mobile device 705 continues to travel to location 712, which is covered by a spot beam serviced by non-autonomous gateway 305*c*. Connectivity of mobile device 705 is still maintained. Non-autonomous gateway 305*c* is in communication with core node 405*b*, this IP address and connectivity of mobile device is still able to be maintained.

In this situation, once it is determined that mobile device 405 is going to transition from the spot beam servicing location 711 to the spot beam servicing location 712, non-autonomous gateway 305*b* sends a notification to non-autonomous gateway 305*c*. The notification is sent at layer-3 (whereas the user traffic is sent at layer-2) from non-autonomous gateway 305*b* to core node 405*a*, core node 405*a* to core node 405*b*, and then from core node 405*b* to non-autonomous gateway 305*c*. Again, at no time during the handoff is connectivity to mobile device 705 lost, or is the IP address of mobile device 705 changed. Thus, system 700 is configured to provide end-to-end continual connectivity, IP address, and session persistence across spot beams in a satellite network.

Figure 8:
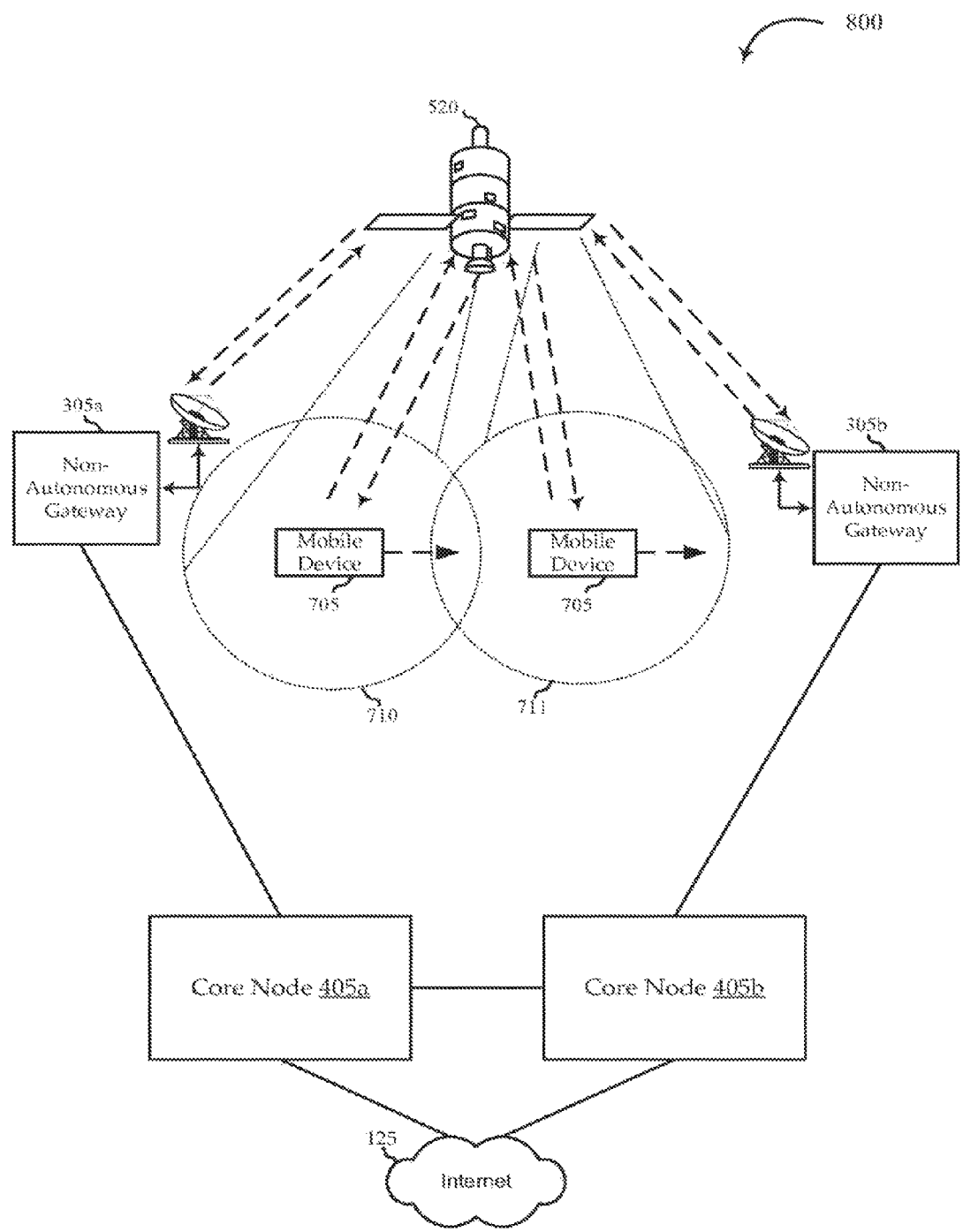
FIG. 8 shows a block diagram of a further embodiment of a network for implementing mobility across spot beams, according to various embodiments of the invention.

Turning now to FIG. 8, which illustrates a system 800 for providing mobility access across satellite spot beams, according to one embodiment of the present invention. In one embodiment, system 800 includes a mobile device 705 in communication with satellite 520. Mobile device 705 is moving, for example, from west to east; however, it should be noted that mobile device 705 could be moving in any direction. In one embodiment, mobile device 705 is a Smartphone, a PDA, a laptop computer, a mobile computer, a cellular telephone, etc. Furthermore, mobile device 705 may be travelling on a train, a plane, and automobile, etc.

Satellite 520 provides mobile device 705 with network connectivity at a first location through a first spot beam 710. Satellite 520 is further configured to provide mobile device 705 with network connectivity at a second location through spot beam 710b. Accordingly, as mobile device 705 moves from location to location, satellite 520 is able to provide mobile device 705 with network connectivity at satellite 520's various spot beams. It should be noted that while only two spot beams are shown, but many more spot beams and many more locations may be present, but for explanatory purposes and ease of understanding, only two spot beams have be shown in FIG. 8.

Once mobile device 705 has established connectivity with satellite 520, mobile device 705 receives session and/or IP information. For example, mobile device 705 is granted an IP address, which is likely a subnet address. In a typical system, when mobile device 705 moves from the coverage of spot beam 710a to spot beam 710b, such session information would be lost, and a new session (or a new IP address) would be established at spot beam 711. Thus, mobile device 705 would lose connectivity, change IP addresses, and would no longer be on the same network (i.e., subnet, LAN, etc.) while the "handoff" from spot beam 710 to spot beam 711 occurs.

According to one embodiment of the present invention, such a loss of connectivity as well as IP address and session information is avoided using the layer-2 connectivity between non-autonomous gateway 305a, non-autonomous gateway 305b, core node 405a and core node 405b. In one embodiment, mobile device 705 is travelling, for example, in a train from New York to San Francisco. For simplicity's sake, only two spot beams have been shown, but in reality there would likely be many more spot beams between San Francisco and New York. As mobile device 705 travels from the first location to the second location it become necessary for a handoff to occur from spot beam 710 to spot beam 711.

At that point, session and IP information stored at non-autonomous gateway 305a is transmitted to core node 405a and then from core node 405a to core node 405b. Then, the session and IP information is transmitted from core node 405b to non-autonomous gateway 305b. Furthermore, the connectivity the entire way from non-autonomous gateway 305a to non-autonomous gateway 305b is at layer-2 of the OSI model. As such, mobile device 705 is able to move from the first location to the second location without any change in connectivity. The handoff is completely transparent to mobile device 705. Mobile device 705's IP address remains the same, no break in connectivity occurs, application sessions are maintained, etc.

Furthermore, satellite 105 establishes a connection with mobile device 705 at the second location using spot beam 710, the session information from mobile device 705's session through spot beam 711 is maintained for the connection at the second location with spot beam 711. Accordingly, mobile device 7052 is unaware that any handoff has occurred, and all session connectivity and information is maintained.

Figure 9:
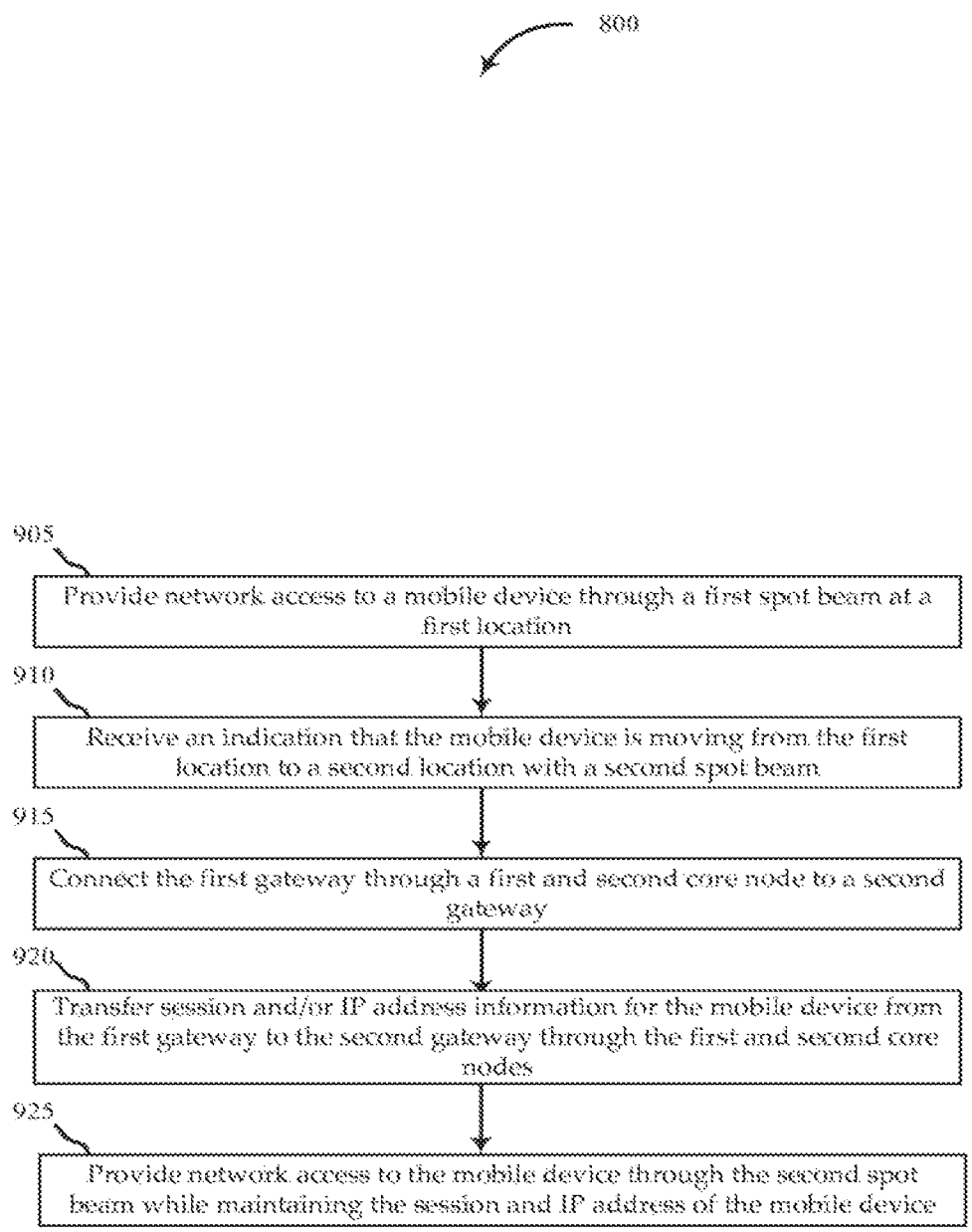
FIG. 9 shows a flow diagram of a method of implementing mobility across spot beams, according to various embodiments.

Referring now to FIG. 9, which illustrates a method 900 of providing mobility access across satellite spot beams, according to one embodiment of the present invention. At process block 905, network access to a mobile device through a first spot beam at a first location is provided. The satellite is further in communication with at least a first and second gateway, which are in turn in communication with at least a first and second core node.

At process block 910, an indication is received that the mobile device is moving from the first location to a second location, where the second location is serviced with a second spot beam. Accordingly, at process block 915, the first gateway connects with a second gateway at a layer-2 through the first and second core nodes. Due to the fact that the connectivity from the first gateway to the first core node, the first core node to the second core node, and then the second core node to the second gateway is at layer-2, and the mobile device is able to maintain the same IP address through the handoff and any application and/or session information (process block 920).

Thus, at process 925, the mobile device at the second location through the second spot beam established access to the network with the same IP and/or session of the mobile device while at the first location connected to the first spot beam. Hence, no connectivity break, no loss of session, no loss IP information, etc., occurs.

Figure 10:
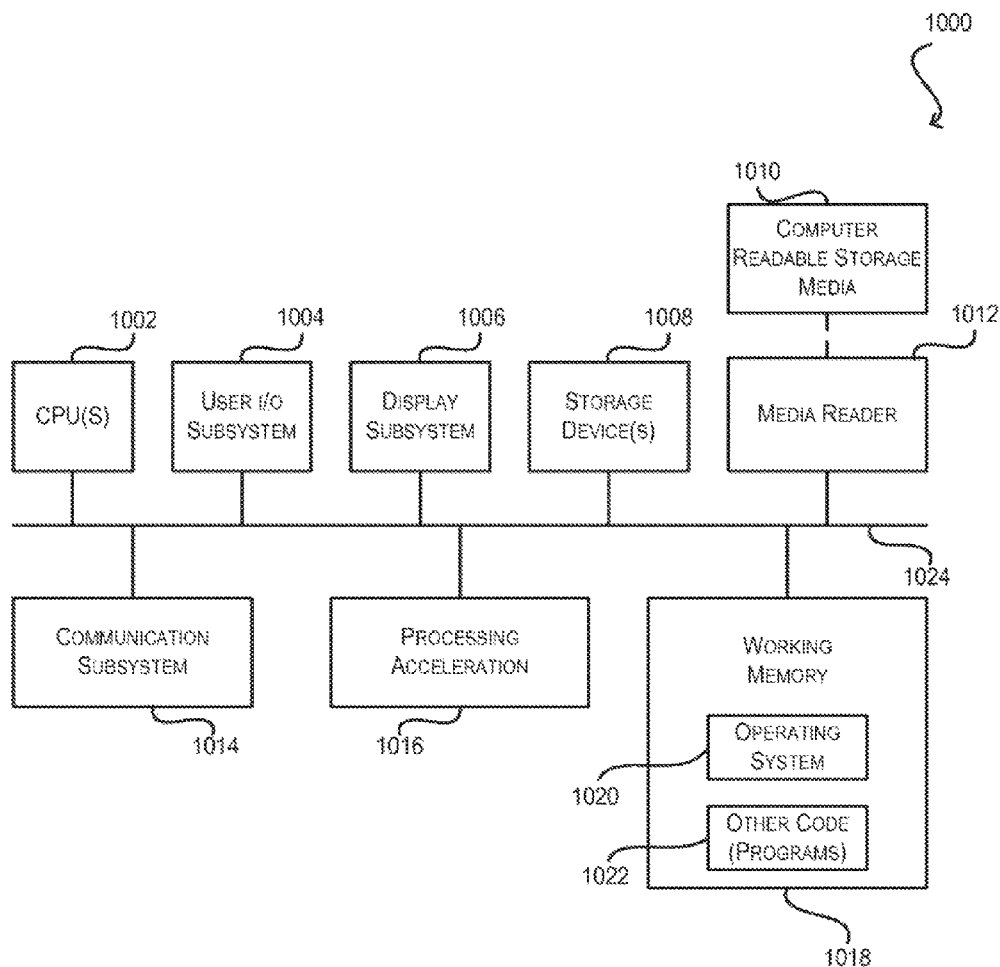
FIG. 10 is a simplified block diagram illustrating the physical components of a computer system that may be used in accordance with an embodiment of the present invention.

FIG. 10 is a simplified block diagram illustrating the physical components of a computer system 1000 that may be used in accordance with an embodiment of the present invention. This diagram is merely an example, which should not unduly limit the scope of the claims. One of ordinary skill in the art would recognize many variations, alternatives, and modifications.

In various embodiments, computer system 1000 may be used to implement any of the computing devices of the present invention. As shown in FIG. 10, computer system 1000 comprises hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). For example, the input devices 1004 are used to receive user inputs for procurement related search queries. Computer system 1000 may also include one or more storage devices 1008. By way of example, storage devices 1008 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 1008. For example, the central processing unit 1002 is configured to retrieve data from the database and process the data for displaying on a GUI.

Computer system 1000 may additionally include a computer-readable storage media reader 1012, a communications subsystem 1014 (e.g., a modem, a network card (wireless or wired), an infra-red communication device, etc.), and working memory 1018, which may include RAM and ROM devices as described above. In some embodiments, computer system 1000 may also include a processing acceleration unit 1016, which can include a digital signal processor (DSP), a special-purpose processor, and/or the like.

Computer-readable storage media reader 1012 can further be connected to a computer-readable storage medium 1010, together (and, optionally, in combination with storage devices 1008) comprehensively representing remote, local, fixed, and/or removable storage devices plus storage media for temporarily and/or more permanently containing computer-readable information. Communications system 1014 may permit data to be exchanged with network and/or any other computer.

Computer system 1000 may also comprise software elements, shown as being currently located within working memory 1018, including an operating system 1020 and/or other code 1022, such as an application program (which may be client application, Web browser, mid-tier application, RDBMS, etc.). In a particular embodiment, working memory 1018 may include executable code and associated data structures for one or more of design-time or runtime components/services. It should be appreciated that alternative embodiments of computer system 1000 may have numerous variations from that described above. For example, customized hardware might also be used and/or particular elements might be implemented in hardware, software (including portable software, such as applets), or both. Further, connection to other computer devices such as network input/output devices may be employed. In various embodiments, the behavior of the view functions described throughout the present application is implemented as software elements of the computer system 1000.

In one set of embodiments, the techniques described herein may be implemented as program code executable by a computer system (such as a computer system 1000) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

While principles of the disclosure have been described above in connection with specific apparatuses and methods, it is to be clearly understood that this description is made only by way of example and not as limitation on the scope of the disclosure. Further, while the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates, otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with-or-without-certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of satellite communication, the method comprising:
    providing communication service of an aircraft via a first spot beam of a satellite;
    obtaining an IP address for a device within the aircraft;
    communicating, via the first spot beam, first communications of a communication session of the device using the IP address;
    transitioning the communication service of the aircraft to a second spot beam when the aircraft is within an overlap of the first spot beam and the second spot beam, wherein the second spot beam is serviced by a gateway having session information for maintaining connectivity of the communication session of the device; and
    communicating, via the second spot beam, second communications of the communication session of the device using the IP address.

2. The method of claim 1, wherein:
    the first spot beam is serviced by a first gateway;
    the second spot beam is serviced by a second gateway, the second gateway having the session information; and
    the transitioning of the communication service comprises changing from the first gateway to the second gateway.

3. The method of claim 2, wherein the second gateway obtains the session information prior to the transitioning of the communication service of the aircraft to the second spot beam.

4. The method of claim 3, wherein the second gateway obtains the session information from the first gateway via a core node.

5. The method of claim 4, wherein the core node and the first and second gateways are on the same non-routed network.

6. The method of claim 1, wherein the transitioning of the communication service of the aircraft to the second spot beam is based on an indication that the aircraft is within the overlap.

7. The method of claim 1, further comprising detecting that the aircraft is within the overlap of the first spot beam and the second spot beam, and wherein the transitioning of the communication service of the aircraft to the second spot beam is in response the detection.

8. The method of claim 7, wherein the first spot beam has a first coverage area, and the second spot beam has a second coverage area at least partially overlapping the first coverage area.

9. The method of claim 1, wherein the satellite includes the first spot beam and the second spot beam.

10. The method of claim 1, wherein the session information includes the IP address of the device.

11. The method of claim 1, wherein the session information includes application information of an application executing on the device.

12. The method of claim 1, wherein the device remains within the same network when the communication service of the aircraft transitions from the first spot beam to the second spot beam.

13. The method of claim 1, wherein the communication session is between the device and an external network.

14. The method of claim 1, wherein the first spot beam is serviced by a first gateway and the second spot beam is serviced by a second gateway, and wherein the first gateway and the second gateway are each a non-autonomous gateway.

15. The method of claim 1, wherein the IP address is associated with a local area network.

16. The method of claim 1, wherein the IP address is a subnet address.

17. The method of claim 1, wherein the communication session is associated with an application executing on the device.

18. The method of claim 1, wherein the communication session is a virtual private network session.

19. The method of claim 1, wherein the connectivity of the communication session of the device is not lost during the transitioning of the communication service of the aircraft to the second spot beam.

20. The method of claim 1, wherein the device is one of a smartphone, a PDA, a laptop computer, a mobile computer, or a cellular telephone.

* * * * *